(12) United States Patent
Sasaki

(10) Patent No.: US 8,679,380 B2
(45) Date of Patent: Mar. 25, 2014

(54) LENS FORMING METHOD

(75) Inventor: Jun Sasaki, Miyagi (JP)

(73) Assignee: Sony Corporation, Tokyo (JP)

( * ) Notice: Subject to any disclaimer, the term of this patent is extended or adjusted under 35 U.S.C. 154(b) by 189 days.

(21) Appl. No.: 13/183,728

(22) Filed: Jul. 15, 2011

(65) Prior Publication Data

US 2012/0026595 A1 Feb. 2, 2012

(30) Foreign Application Priority Data

Jul. 29, 2010 (JP) ................ 2010-170886

(51) Int. Cl.
  *B29D 11/00* (2006.01)
(52) U.S. Cl.
  USPC .......... 264/1.36; 264/1.38; 264/496
(58) Field of Classification Search
  USPC .......... 264/1.36, 1.38, 1.7, 494, 496
  See application file for complete search history.

(56) References Cited

U.S. PATENT DOCUMENTS 4,983,335 A * 1/1991 Matsuo et al. ........... 264/496
5,801,884 A * 9/1998 Sato et al. ............... 359/620

FOREIGN PATENT DOCUMENTS

JP  2008-152038  7/2008
JP  2008-152040  7/2008

* cited by examiner

*Primary Examiner* — Mathieu D. Vargot
(74) *Attorney, Agent, or Firm* — Dentons US LLP

(57) ABSTRACT

A lens forming method comprising the steps of: interposing an uncured resin between a lens molding plate and a flat-shaped transparent substrate that are disposed to face each other so as to keep an externally-opening distance; and performing light irradiation on the resin interposed between the lens molding plate and the transparent substrate so that curing of the resin advances from lens curved-surface parts on the lens molding plate toward a periphery thereof.

4 Claims, 8 Drawing Sheets

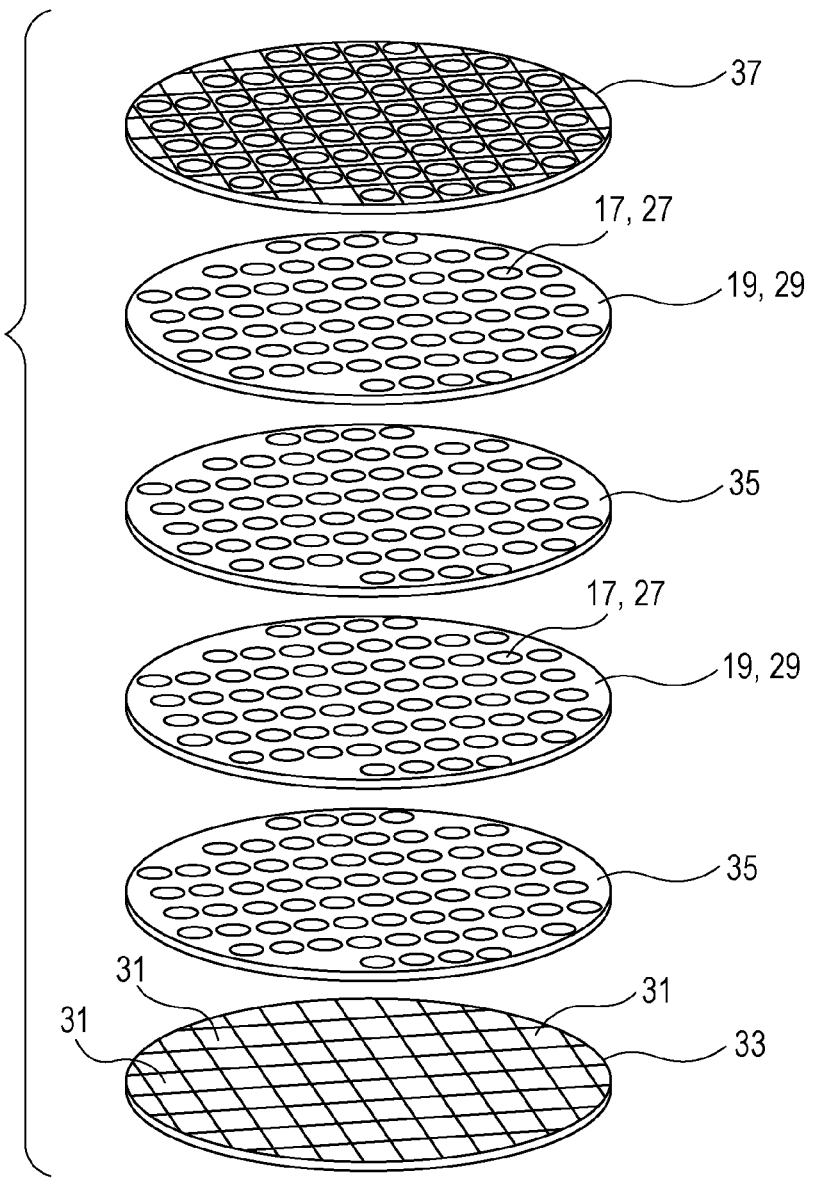

LENS FORMING METHOD

BACKGROUND

The present disclosure relates to a lens forming method, a lens, and a camera module and, in particular, to a lens forming method using a photo-curable resin, a lens obtained by this forming method, and a camera module configured by using this lens.

In lens formation using a resin, an uncured ultraviolet-curable resin is supplied to a mold having a lens curved surface formed thereon, and a glass substrate is pressed onto the surface of the mold supplied with the uncured resin. At this time, a gap material keeping a predetermined small distance on the periphery of the entire lens curved surface is disposed. This makes superfluous resin and air bubbles easily drawn out. In this state, by collectively irradiating the uncured resin with ultraviolet rays via a glass substrate, the resin is cured (refer to Japanese Unexamined Patent Application Publication No. 2008-152038 (in particular, refer to paragraph 0077) and Japanese Unexamined Patent Application Publication No. 2008-152040 (in particular, refer to paragraph 0087)).

SUMMARY

However, in the lens manufacturing method described above, with collective irradiation with ultraviolet rays from a glass substrate side, curing of the uncured resin starts all at once from the glass substrate side irradiated with ultraviolet rays. For this reason, for example, in convex lens formation, curing first completes in a thickness direction in a circumferential edge part having a thin lens thickness and further its peripheral part, with a center portion of the lens being sealed. At this time, since the resin more or less shrinks on curing, the sealed portion becomes in a decompressed state, which may cause voids with an amount corresponding to shrinkage on curing. The occurrence of voids on the lens surface causes a surface defect, and the occurrence of voids inside the lens causes an internal defect.

It is desirable to provide a lens forming method capable of preventing the occurrence of a defect, such as voids, and further provide a lens without the occurrence of a defect by applying this forming method and provide a camera module having this lens.

A lens forming method is performed with the following procedure in an embodiment of the present disclosure. First, an uncured resin is interposed between a lens molding plate and a flat-shaped transparent substrate that are disposed to face each other so as to keep an externally-opening distance. Next, light irradiation is performed on the resin interposed between the lens molding plate and the transparent substrate so that the curing of the resin advances from lens curved-surface parts on the lens molding plate toward a periphery thereof.

In this forming method, when the resin shrinks on curing on the lens curved-surface part, where curing advances earlier, the uncured resin is supplied to the lens curved-surface part from its periphery. At this time, since an externally-opening distance is kept between the lens molding plate and the transparent substrate, the supply of the uncured resin to the lens curved-surface part from the periphery is not inhibited. With this, a negative pressure is not caused in the lens curved-surface part, and the occurrence of voids is prevented.

Also, an embodiment of the present disclosure is directed to a lens obtained in this manner and a camera module including this lens. This lens includes a flat-shaped transparent substrate and a resin lens part having a lens curved surface disposed on the transparent substrate. In particular, the resin lens part has a circumferential edge formed in a tapered shape that is wider toward the transparent substrate. This tapered shape is caused by a phenomenon in which, when an uncured resin is supplied to a lens curved-surface part, where curing advances earlier, from its periphery, a resin shrinkage occurs more on a lens molding plate side than on the transparent substrate, which configures a part of the lens to have a higher property of adhesion to resin.

As described above, according to an embodiment of the present disclosure, the occurrence of voids can be reliably prevented in lens formation using a resin, and yields can be improved. Also, the quality of the lens obtained by applying this method and the camera module using this lens can be improved.

BRIEF DESCRIPTION OF THE DRAWINGS

FIG. 7 is a structural diagram for describing a camera module manufacturing method according to a forth embodiment;

DETAILED DESCRIPTION OF EMBODIMENTS

Embodiments of the present disclosure are described below based on the drawings in the following order.

1. First Embodiment (Method of Light Irradiation Using a Mask in Convex Lens Formation)
2. Second Embodiment (Method of Light Irradiation with a Light Intensity Distribution in Convex Lens Formation)
3. Third Embodiment (Concave Lens Forming Method)
4. Fourth Embodiment (Camera Module Forming Method and Camera Module)

First Embodiment

Method of Light Irradiation Using a Mask in Convex Lens Formation

FIGS. 1A to 1C, 2, and 3A to 3C are process drawings for describing a lens forming method according to a first embodiment of the present disclosure. Here, a method of forming convex lenses in an array is described based on these FIGS. 1A to 1C, 2, and 3A to 3C.

Figure 1A:
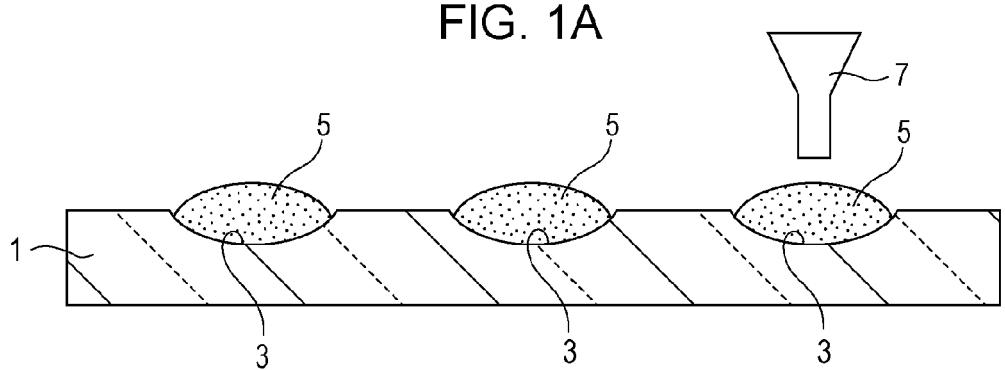
FIGS. 1A to 1C are sectional process drawings (part 1) of a procedure of convex lens formation according to a first embodiment.

First, as depicted in FIG. 1A, a lens molding plate 1 is prepared. This lens molding plate 1 has a plurality of lens curved-surface parts 3 on one main surface side. On each of the lens curved-surface parts 3, a concave curved surface for forming a convex lens is formed, and these curved surfaces are arranged in a matrix on the one main surface side of the lens molding plate 1. For example, when a lens to be formed herein is incorporated in a camera module, it is assumed that the state of arrangement of the lens curved-surface parts 3 matches the state of on-wafer arrangement of image pickup devices configuring the camera module. Also, this lens molding plate 1 may be a metal mold or may be made of a light-transmissive material. Here, by way of example, the lens molding plate 1 is assumed to be made of a light-transmissive material.

Next, an uncured resin 5 is supplied to each of the lens curved-surface part 3 of this lens molding plate 1. The resin 5 for use herein is a resin that is cured by light irradiation, and is assumed to be, for example, an ultraviolet-curable resin. The ultraviolet-curable resin may be any of a cationic or radical type.

Here, for example, the resin 5 charged in a syringe or the like is quantitatively applied by a dispenser 7 or the like, and the uncured resin 5 is supplied to each lens curved-surface part 3 in a separate and independent manner. The amount of supply of the resin 5 to each lens curved-surface part 3 is adjusted so that, when a transparent substrate is later disposed to face the lens molding plate 1, the resin 5 overflows from the lens curved-surface part 3 to spread over its periphery and the resins 5 supplied to adjacent lens curved-surface parts 3 are kept independent without being integrated.

Figure 1B:
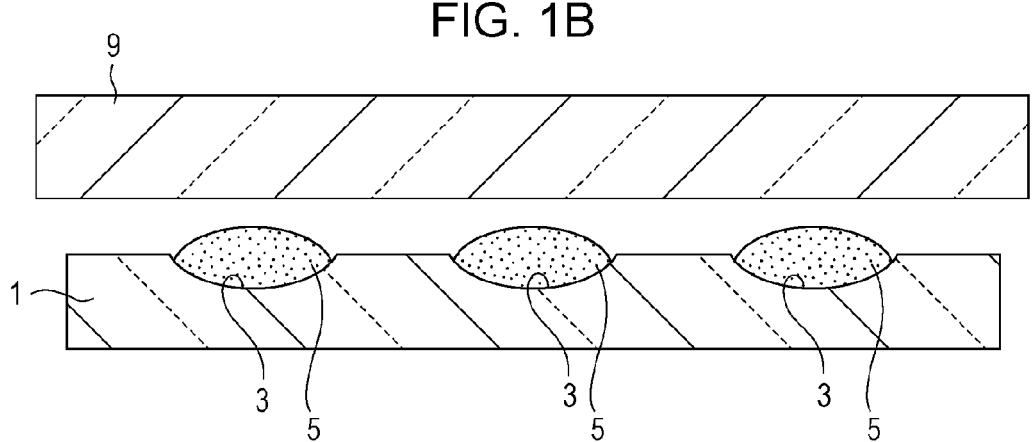

In this state, as depicted in FIG. 1B, a flat-shaped transparent substrate 9 to be disposed to face the lens molding plate 1 is prepared. This transparent substrate 9 is assumed to configure a part of each lens and be configured by using a material having a property of adhesion to the resin 5 higher than a property of adhesion between the resin 5 and the lens molding plate 1. As this transparent substrate 9, for example, a glass substrate is used. Also, this transparent substrate 9 has an outer shape approximately identical to that of a wafer on which a plurality of image pickup devices are formed.

Figure 1C:
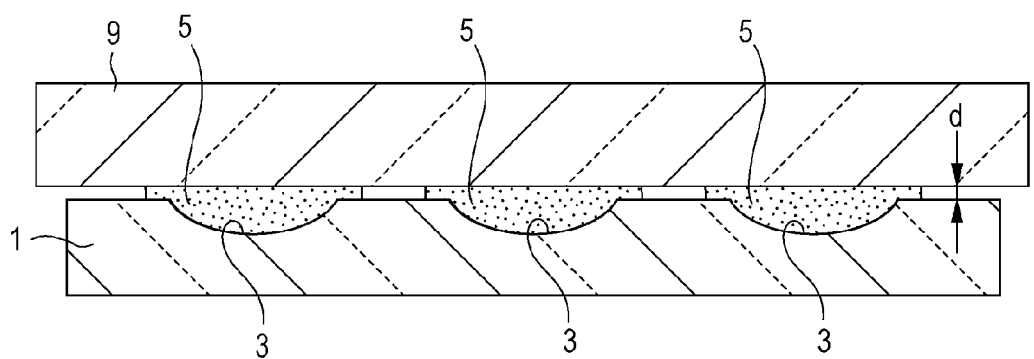

Next, as depicted in FIG. 1C, the transparent substrate 9 is disposed to face a surface side of the lens molding plate 1 where the lens curved-surface parts 3 are formed, and the uncured resin 5 is interposed between the lens molding plate 1 and the transparent substrate 9. At this time, between the lens molding plate 1 and the transparent substrate 9, a predetermined externally-opening distance d is kept as a clearance. With this, while the resins 5 supplied to adjacent lens curved-surface parts 3 are being kept in an independent state without being integrated, the resin 5 supplied to each lens curved-surface part 3 is caused to overflow from the lens curved-surface part 3 and spread over its periphery.

Figure 2:
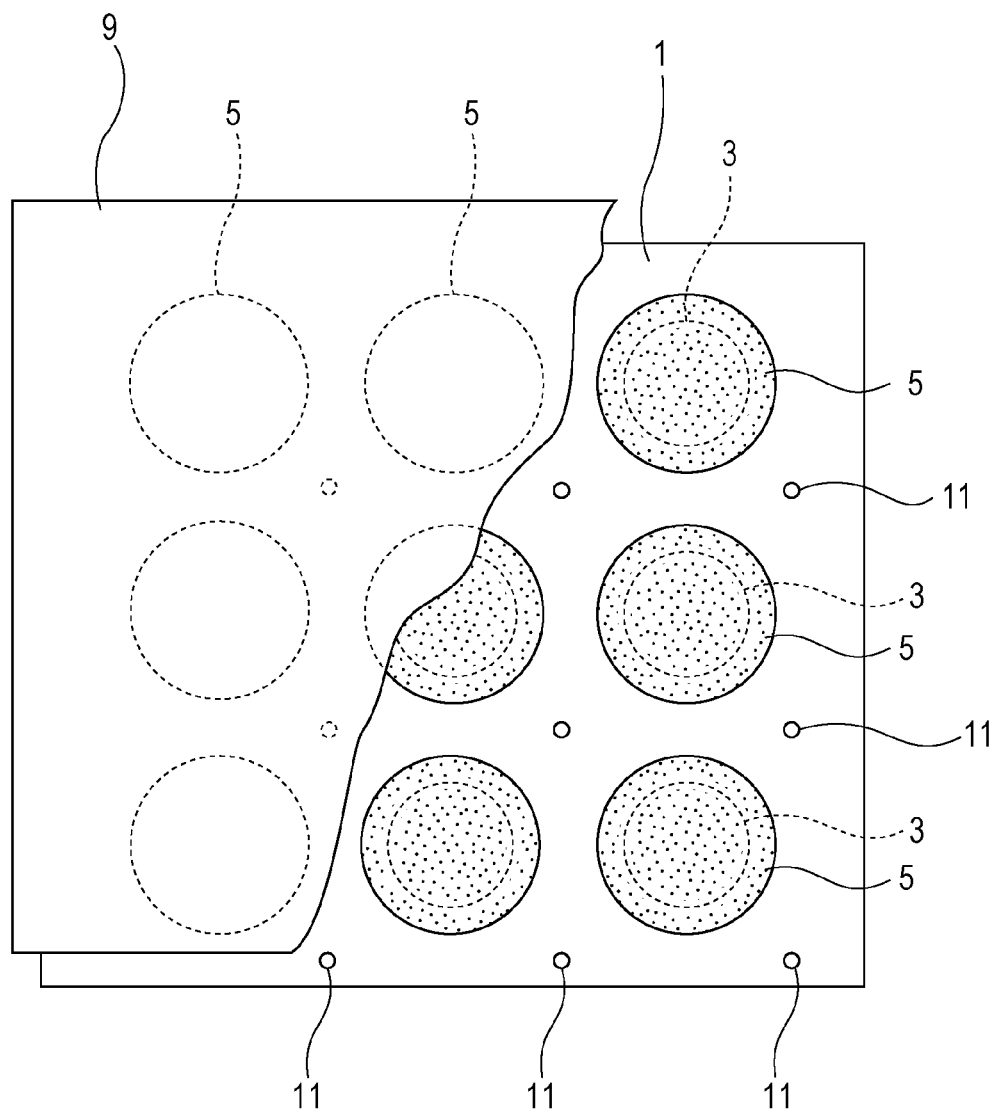
FIG. 2 is a plan view of a characteristic part of convex lens formation according to the first embodiment.

FIG. 2 is a plan view corresponding to FIG. 1C, with the transparent substrate 9 partially sectioned for description. As depicted in this drawing, with the uncured resin 5 interposed between the lens molding plate 1 and the transparent substrate 9, the uncured resin 5 is disposed so as to cover each lens curved-surface part 3 and its periphery. Also, the resin 5 supplied to each lens curved-surface part 3 is kept in an independent state, thereby making the periphery of each resin 5 communicate outside the lens molding plate 1 and the transparent substrate 9.

Here, to keep the distance d between the lens molding plate 1 and the transparent substrate 9, spacers 11 may be interposed between the lens molding plate 1 and the transparent substrate 9. These spacers 11 are each preferably provided at a position out of each lens curved-surface part 3 and between the resins 5. Also, the lens molding plate 1 and the transparent substrate 9 make the distance d kept by, for example, being equally pressed from outside. Furthermore, the lens molding plate 1 and the transparent substrate 9 may be provided with an externally-opening flow path at a position out of each lens curved-surface part 3 and between the resins 5.

The process so far can be performed in the air, but is preferably performed in a decompressed atmosphere. With this, the process can be performed while preventing trapping of air bubbles in the resin 5, and the occurrence of an internal defect due to the mixing of air bubbles in the lens is prevented, leading to an improvement in yields. Also, after the uncured resin 5 is interposed between the lens molding plate 1 and the transparent substrate 9 in a predetermined state, the process atmosphere is returned to atmospheric pressure, or is changed to a compressed atmosphere.

Figure 3A:
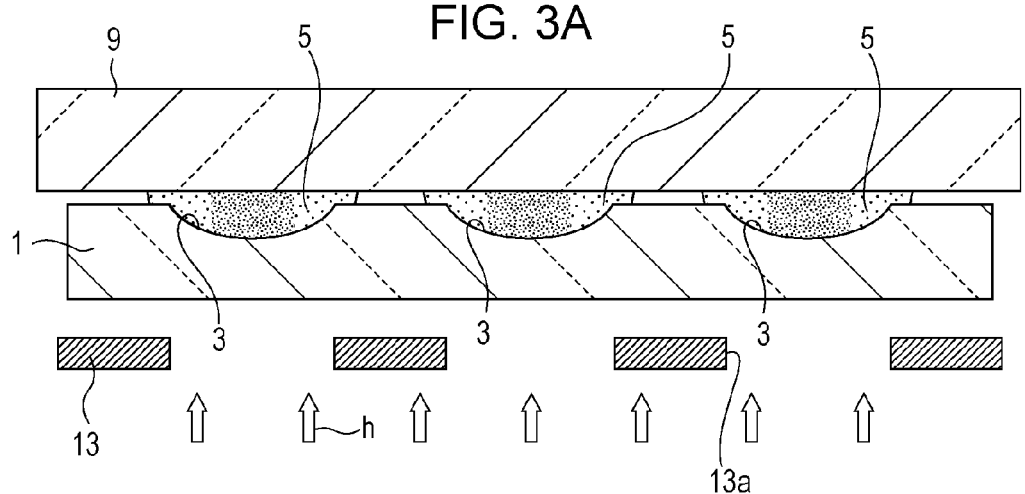
FIGS. 3A to 3C are sectional process drawings (part 2) of the procedure of convex lens formation according to the first embodiment.

Next, as depicted in FIG. 3A, the resin 5 interposed between the lens molding plate 1 and the transparent substrate 9 is irradiated with light (for example, ultraviolet rays) h, thereby starting curing of the resin 5. Here, light irradiation at a first stage is performed by using a mask 13 capable of cutting off the light h for use in curing the resin 5. This mask 13 has a plurality of openings 13a respectively corresponding to the lens curved-surface parts 3. By way of example, these openings 13a are each assumed to have an approximately same size as that of each lens curved-surface part 3.

Here, the mask 13 is disposed outside the lens molding plate 1 formed of a light-transmissive material. The openings 13a of the mask 13 are then positioned so as to correspond to the lens curved-surface parts 3 of the lens molding plate 1. In this state, irradiation of the light h is performed from outside the mask 13, and the resin 5 on each lens curved-surface part 3 is irradiated with the light h passing through the openings 13a of the mask 13 and then through the lens molding plate 1. From the irradiated part of the resin 5, curing is started.

At this time, irradiation of the light h is performed via the mask 13 so as to prevent a part of the resin 5 spreading over the periphery of each lens curved-surface part 3 from being irradiated with the light h. This prevents the resin 5 on the periphery of each lens curved-surface part 3 from being cured to cause the lens curved-surface part 3 to become in a sealed state. With this, the curing of the resin 5 on the lens curved-surface part 3 is advanced, while the uncured resin 5 is being supplied to the lens curved-surface part 3 from its peripheral part, the lens curved-surface part 3 shrinking on curing due to the start of curing of the resin 5 at this stage.

In light irradiation at the first stage described above, the shape of each opening 13a of the mask 13 with respect to each lens curved-surface part 3 and the amount of irradiation of the light h have an influence on the curing process of the resin 5 described above, and thus have an influence on transfer accuracy of the lens to be obtained by completely curing the resin 5. Therefore, it is important to perform light irradiation at the first stage with the shape of each opening 13a and the amount of irradiation of the light h being optimized so as to allow the curing process of the resin 5 described above and improve transfer accuracy of the lens.

Note that, in irradiation of the light h via the mask 13 from a lens molding plate 1 side, diffraction of the light h at the edge of each opening 13a may occur, and the outgoing light h from each lens curved-surface part 3 of the lens molding plate 1 may be refracted. Due to such influences, the light h tends to scatter particularly at the edge of the opening 13a. For this reason, as long as the curing of the resin 5 can be advanced on the lens curved-surface part 3 while the uncured resin 5 is being supplied from the peripheral part of the lens curved-surface part 3 as described above, the structure of the opening 13a of the mask 13 is not restricted to be smaller than the lens curved-surface part 3.

Figure 3B:
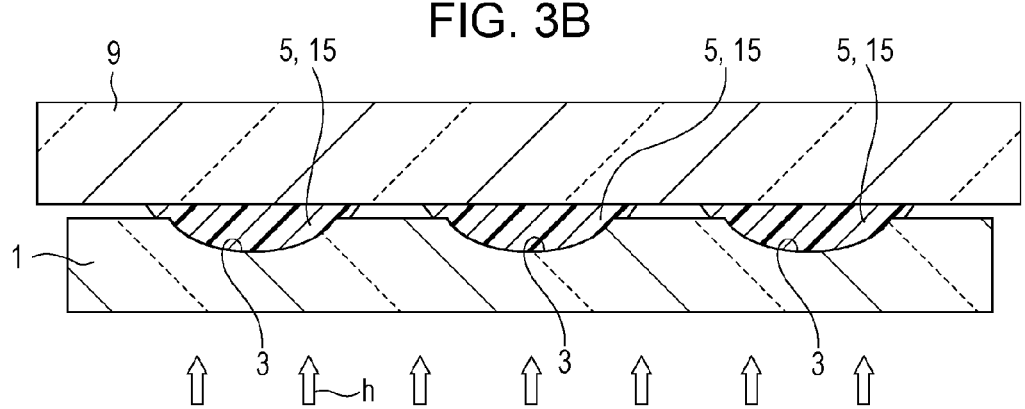

Next, as depicted in FIG. 3B, the mask is removed, and the resin 5 is entirely irradiated with the light h from outside the lens molding plate 1 formed of a light-transmissive material. With this, light irradiation at a second stage is performed in which the resin 5 is completely cured up to the periphery of the lens curved-surface part 3. Here, light irradiation is performed with an amount of irradiation corresponding to a recommended cumulative amount of light for curing the resin 5.

With irradiation of the light h with two stages described above, the curing of the resin 5 is advanced from the lens curved-surface part 3 toward its periphery to completely cure the resin 5. The completely-cured resin 5 becomes resin lens parts 15, with the curved-surface shape of each lens curved-surface part 3 of the lens molding plate 1 being transferred thereto.

The curing process of the resin 5 by light irradiation with two stages as described above is preferably performed at atmospheric pressure or in a compressed atmosphere. With this, fluidity of the resin 5 to the lens curved-surface part 3 associated with shrinkage on curing of the resin 5 is ensured, and also the internal pressure of the resin 5 is maintained to prevent expansion of minute air bubbles remaining in the resin 5. At this time, a higher pressure is preferable at an interface between the lens molding plate 1 and the resin 5 and an interface between the transparent substrate 9 and the resin 5 because of having higher effects of ensuring fluidity of the resin 5 and suppressing expansion of air bubbles.

Also, when the resin 5 is a cationic-type ultraviolet-curable resin, the process atmosphere at this time can be atmospheric or air atmosphere. On the other hand, when the resin 5 is a radical-type ultraviolet-curable resin, the atmosphere is preferably an atmosphere without containing oxygen, such as a nitric atmosphere, so as to prevent curing inhibition by oxygen. However, the influence of curing inhibition by oxygen is limited because curing inhibition occurs only at an outer circumferential part in contact with the process atmosphere. If this influence does not have to be considered, the atmosphere may be atmospheric or air atmosphere.

Figure 3C:
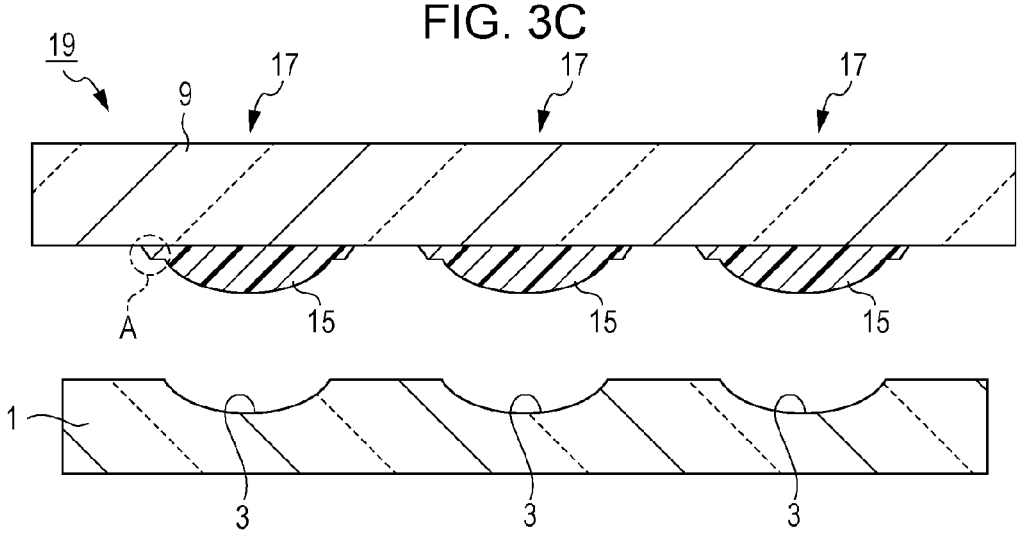

Next, as depicted in FIG. 3C, by raising the transparent substrate 9, the transparent substrate 9 and the resin lens parts 15 in intimate contact with this transparent substrate 9 are peeled off from a lens molding plate 1 side. At this time, even after the process of irradiation of the light h described above ends, a curing reaction of the resin configuring the resin lens parts 15 continues. For this reason, preferably, the shape of each resin lens part 15 is stabilized by taking some time after the process of irradiation of the light h ends, and then the resin lens parts 15 are peeled off from the lens molding plate 1. This also has an effect such that an increased temperature of the resin due to irradiation of the light h is decreased with time, thereby increasing releasability of the resin lens parts 15 from the lens molding plate 1 to allow releasing with a smaller force.

In a manner as described above, convex lenses 17 formed of the flat-shaped transparent substrate 9 and the resin lens parts 15 disposed on the transparent substrate 9 are obtained. Also, a lens array 19 with the plurality of resin lens parts 15 arranged on the transparent substrate 9 is obtained. Each of the convex lenses 17 has a feature of having a convex lens curved shape in the resin lens part 15 and having a circumferential edge A of each resin lens part 15 molded in a tapered shape that is wider toward the transparent substrate 9.

Here, each resin lens part 15 is obtained by advancing the curing of the resin 5 from the lens curved-surface part 3 toward its periphery by irradiation of the light h with two stages described above, and the uncured resin 5 is supplied to the lens curved-surface part 3, where curing advances earlier, from its periphery. At this time, the resin 5 flows to a lens curve-surface part 3 side on a lens molding plate 1 side with a property of adhesion to the resin 5 smaller than that of the transparent substrate 9 to cause shrinkage of the resin 5. With this, the resin 5 is cured in a tapered shape that is wider toward the transparent substrate 9.

Also, thereafter, each convex lens 17 may be singly hardened by cutting the transparent substrate 9 for each resin lens part 15 in some cases.

According to the first embodiment described above, the uncured resin 5 interposed between the lens molding plate 1 and the transparent substrate 9 that are disposed to face each other so as to keep the externally-opening distance d is subjected to light irradiation with two stages so that the curing of the resin 5 advances from each lens curved-surface part 3 toward its periphery. With this, when the resin 5 shrinks on curing on the lens curved-surface part 3 where curing advances earlier, the uncured resin 5 is supplied to the lens curved-surface part 3 from its periphery. At this time, since the externally-opening distance d is kept between the lens molding plate 1 and the transparent substrate 9, the supply of the uncured resin 5 to the lens curved-surface part 3 from its periphery is not inhibited.

Thus, the lens curved-surface part 3 is not caused to be in a decompressed state, and the occurrence of voids can be prevented. In particular, by performing the process of light irradiation described above in a compressed atmosphere, fluidity of the resin 5 to the lens curved-surface part 3 can be ensured, and also the internal pressure of the resin 5 can be maintained to prevent expansion of minute air bubbles remaining in the resin 5.

Also, since the curing of the resin 5 is advanced at atmospheric pressure or in a compressed atmosphere without causing the lens curved-surface part 3 to be in a decompressed state, fluctuations in pressure from the start to end of the curing of the resin 5 are small. Therefore, an inner distortion can be prevented from remaining in the resin lens parts 15 obtained by curing, the occurrence of aberration and retardation of the lens and others can be prevented, and therefore the convex lens 17 with excellent optical characteristics can be obtained.

Furthermore, since the curing of the resin 5 is advanced at atmospheric pressure or in a compressed atmosphere without causing the lens curved-surface part 3 to be in a decompressed state, when the cured resin lens parts 15 are peeled off from the lens molding plate 1, the resin lens parts 15 are not deformed in a shrinking direction due to residual stress in a tensile direction. With this, the convex lenses 17 having transfer accuracy of the shape with respect to the lens molding plate 1 being excellently kept can be obtained. By contrast, under a light irradiation condition where voids occur in the cured resin, the pressure becomes a saturated vapor pressure of the resin to be in an extremely low pressure state. Thus, in the cured resin, a residual stress occurs in a tensile direction. For this reason, when the resin lens parts are peeled off from the lens molding plate 1, the resin lens parts 15 are deformed in a shrinking direction by the residual stress in a tensile direction.

As a result, according to the lens forming method of the first embodiment, the occurrence of voids can be reliably prevented in lens formation using a resin, and a lens with excellent optical characteristics and shape accuracy can be obtained.

Note that in the first embodiment described above, description has been made to the procedure of light irradiation for curing the resin 5 with two stages, that is, light irradiation using a mask and collective light irradiation thereafter. However, light irradiation for curing the resin 5 may be performed with further more stages in which the opening diameter of the mask is gradually widened as long as the curing process of the resin 5 described above is performed. Also, in the first embodiment, the lens molding plate 1 is configured of a light-transmissive material, and description has been made to the procedure in which, in the process of curing the resin 5 by irradiation of the light h with two stages described by using FIGS. 3A and 3B, irradiation of the light h is performed from the lens molding plate 1 side. However, the lens molding plate 1 may be configured by using a material that does not allow the light h to pass through, such as a metal mold. In this case, irradiation of the light h with two stages described above is performed from a transparent substrate 9 side.

When light irradiation is performed from the transparent substrate 9 side, the shape of each opening 13a of the mask 13 for use in light irradiation at the first stage and the amount of irradiation of light at the second stage are optimized separately from light irradiation from the lens molding plate 1 side, so that the curing process of the resin 5 described above is performed to improve transfer accuracy of the lens.

Second Embodiment

Figure 4A:
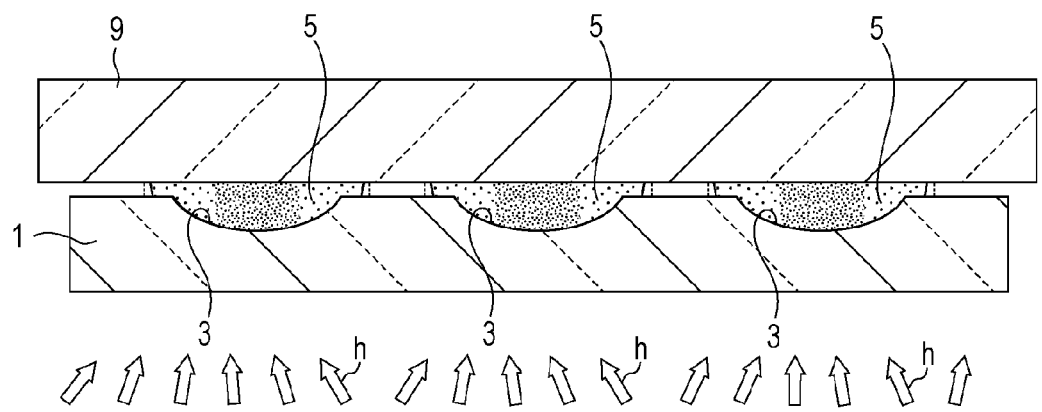
FIGS. 4A and 4B are sectional process drawings of a characteristic part of convex lens formation according to a second embodiment.
Figure 4B:
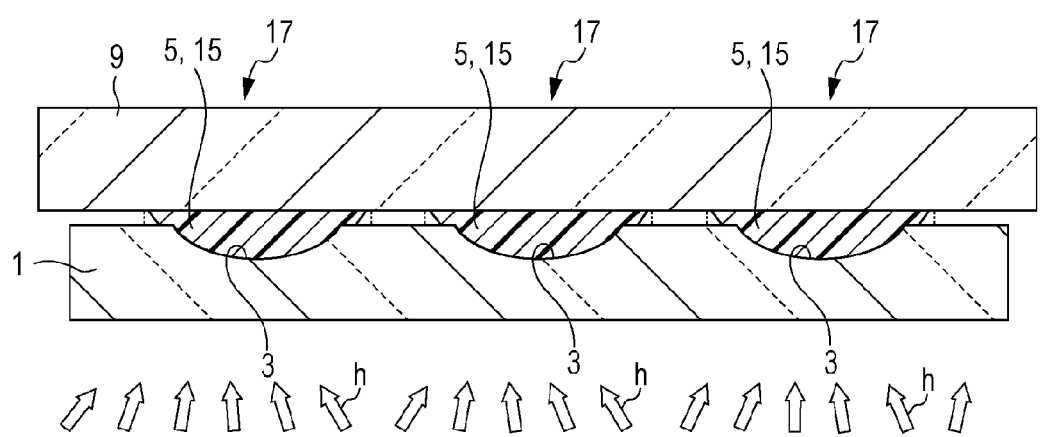

Method of Light Irradiation with a Light Intensity Distribution in Convex Lens Formation FIGS. 4A and 4B depict a process of a characteristic part viewed in section in a second embodiment. The lens forming method of the second embodiment depicted in FIGS. 4A and 4B is different from the forming method of the first embodiment in a procedure in which irradiation of the light h on the uncured resin is performed with one stage, and other processes are similar to those of the first embodiment.

That is, in the second embodiment, as depicted in FIG. 4A, when the uncured resin 5 is irradiated with the light h, light irradiation is performed with a light intensity distribution in which the lens curved-surface part 3 is irradiated with the light h with an amount of light larger than an amount of light of its periphery. With this, curing of the resin 5 is advanced from the lens curved-surface part 3 to its periphery.

Light irradiation having a light intensity distribution as described above is performed by using a lens array with condenser lenses disposed in a matrix. In this case, the lens array is disposed to face the lens molding plate 1, and irradiation of light gathered by each of the condenser lenses corresponding to the lens curved-surface parts 3 is collectively performed. At this time, the periphery of each lens curved-surface part 3 is also irradiated with the light h with an intensity lower than that of the lens curved-surface part 3.

At this time, as with the first embodiment, the curing of the resin 5 starts from the lens curved-surface part 3 irradiated with the light h with a higher light intensity. With this, the curing of the resin 5 is advanced, while the uncured resin 5 is being supplied to the lens curved-surface part 3, where the resin 5 shrinks on curing, from its peripheral part.

In this case, the intensity distribution of the light h for irradiation on the resin 5 has an influence on the curing process of the resin 5 described above, and thus has an influence on transfer accuracy of the lens to be obtained by completely curing the resin 5. Therefore, it is important to perform collective irradiation of the light h with a light intensity distribution being optimized so as to allow the curing process of the resin 5 described above and improve transfer accuracy of the lens.

With collective irradiation of the light h with the light intensity distribution as described above, as depicted in FIG. 4B, the curing of the resin 5 is advanced from the lens curved-surface part 3 toward its periphery to completely cure the resin 5. The completely-cured resin 5 becomes resin lens parts 15, with a curved-surface shape of each lens curved-surface part 3 of the lens molding plate 1 being transferred thereto.

Even the curing process of the resin 5 by light irradiation as described above is preferably performed at atmospheric pressure or in a compressed process atmosphere, similarly to the first embodiment.

As with the first embodiment, even the convex lenses 17 and the lens array 19 obtained through the procedure of the second embodiment described above each have the flat-shaped transparent substrate 9 and the resin lens parts 15 disposed on the transparent substrate 9. Each of the resin lens parts 15 has a feature of having a lens curved surface and being molded in a tapered shape with a circumferential edge being wider toward the transparent substrate 9.

According to the second embodiment described above, on the uncured resin 5 interposed between the lens molding plate 1 and the transparent substrate 9 that are disposed to face each other so as to keep the externally-opening distance d, light irradiation is performed with a light intensity distribution so that the curing of the resin 5 advances from the lens curved-surface part 3 toward its periphery. With this, as described in the first embodiment, when the resin 5 shrinks on curing on the lens curved-surface part 3, where curing advances earlier, a negative pressure is not formed in the lens curved-surface part 3. Therefore, as with the first embodiment, the occurrence of voids can be reliably prevented in lens formation using a resin, and a lens with excellent optical characteristics and shape accuracy can be obtained.

Note that also in the second embodiment described above, the lens molding plate 1 may be configured by using a material that does not allow the light h to pass through, such as a metal mold. In this case, as with the first embodiment, irradiation of the light h is performed from a transparent substrate 9 side. In this case, the light intensity distribution in collective irradiation is optimized separately from light irradiation from the lens molding plate 1 side, so that the curing process of the resin 5 described above is performed to improve transfer accuracy of the lens.

Third Embodiment

Concave Lens Forming Method

FIGS. 5A to 5C and FIGS. 6A to 6C are process drawings for describing a lens forming method according to a third embodiment of the present disclosure. Here, based on these FIGS. 5A to 5C and FIGS. 6A to 6C, a method of forming concave lenses in an array is described. Note that in the third embodiment, structures identical to those of the first embodiment are provided with the same reference characters, and redundant description is omitted.

Figure 5A:
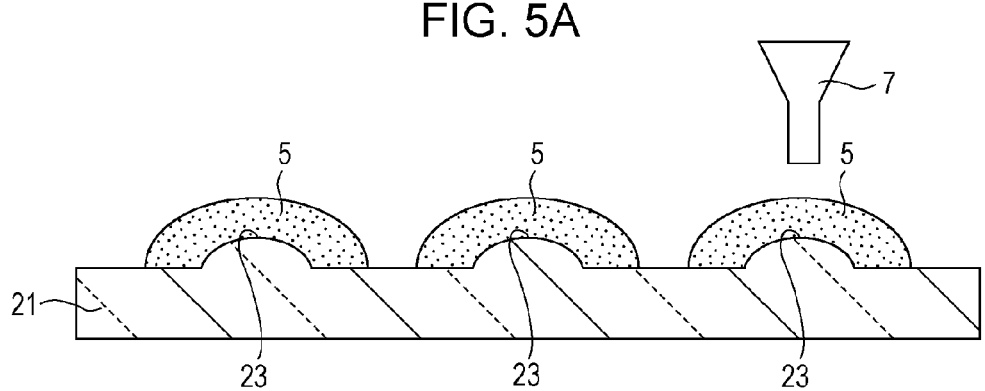
FIGS. 5A to 5C are sectional process drawings (part 1) of a procedure of concave lens formation according to a third embodiment.

First, as depicted in FIG. 5A, a lens molding plate 21 is prepared. This lens molding plate 21 has a plurality of lens curved-surface parts 23 on one main surface side. On each of the lens curved-surface parts 23, a convex curved surface for forming a concave lens is formed, and these curved surfaces are arranged in a matrix on the one main surface side of the lens molding plate 21. For example, when a lens to be formed herein is incorporated in a camera module, it is assumed that the state of arrangement of the lens curved-surface parts 23 matches the state of on-wafer arrangement of image pickup devices configuring the camera module. Also, this lens molding plate 21 may be a metal mold or may be made of a light-transmissive material. Here, by way of example, the lens molding plate 21 is assumed to be made of a light-transmissive material.

The third embodiment is different from the first embodiment in the shape of the lens molding plate 21 as described above, and the other structures and procedures may be similar to those of the first embodiment. A procedure is described below.

First, the uncured resin 5 is supplied to each of the lens curved-surface part 23 of the above-structured lens molding plate 21. The resin 5 for use herein is a resin that is cured by light irradiation, and is assumed to be, for example, an ultraviolet-curable resin. The ultraviolet-curable resin may be any of a cationic or radical type.

Here, for example, the resin 5 charged in a syringe or the like is quantitatively applied by a dispenser 7 or the like, and the uncured resin 5 is supplied to each lens curved-surface part 23 in a separate manner. The amount of supply of the resin 5 to each lens curved-surface part 23 is adjusted so that, when a transparent substrate is later disposed to face the lens molding plate 21, the resin 5 overflows from the lens curved-surface part 23 to spread over its periphery and the resins 5 supplied to adjacent lens curved-surface parts 3 are kept independent without being integrated.

Figure 5B:
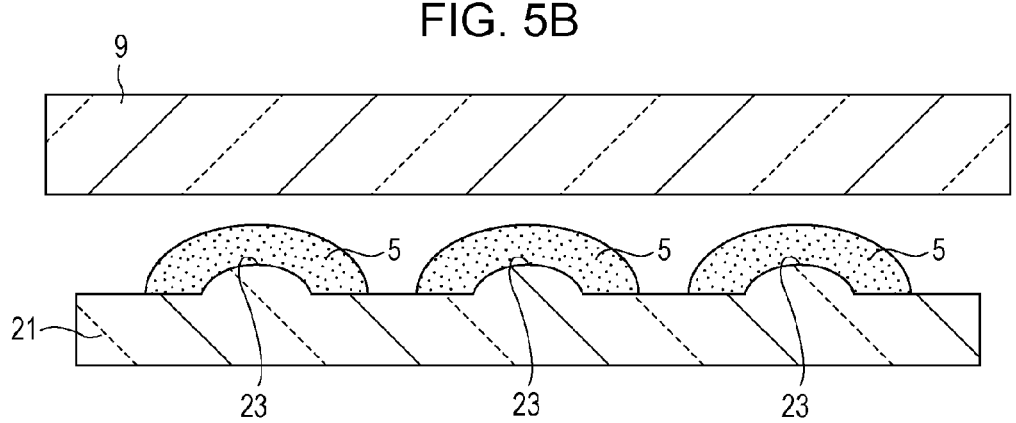

In this state, as depicted in FIG. 5B, a flat-shaped transparent substrate 9 to be disposed to face the lens molding plate 21 is prepared. This transparent substrate 9 is assumed to configure a part of each lens and be configured by using a material having a property of adhesion to the resin 5 higher than a property of adhesion between the resin 5 and the lens molding plate 21. As this transparent substrate 9, for example, a glass substrate is used. Also, this transparent substrate 9 has an outer shape approximately identical to that of a wafer on which a plurality of image pickup devices are formed.

Figure 5C:
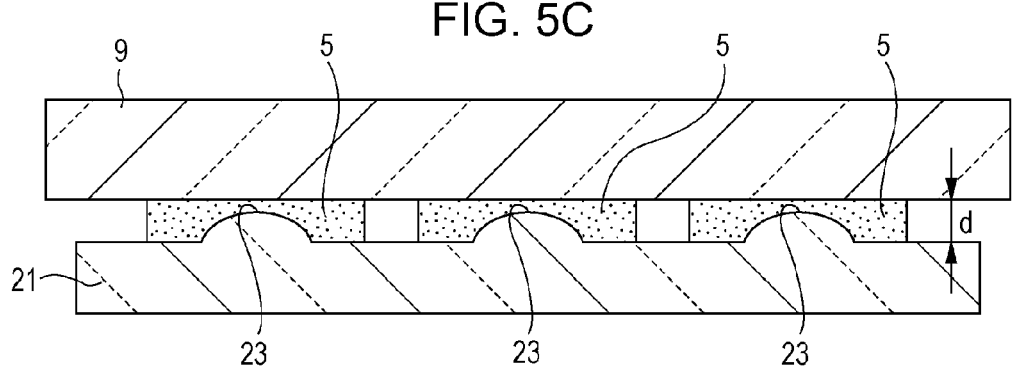

Next, as depicted in FIG. 5C, the transparent substrate 9 is disposed to face a surface side of the lens molding plate 21 where the lens curved-surface parts 23 are formed, and the uncured resin 5 is interposed between the lens molding plate 21 and the transparent substrate 9. At this time, between the lens molding plate 21 and the transparent substrate 9, a predetermined externally-opening distance d is kept as a clearance. With this, while the resins 5 supplied to adjacent lens curved-surface parts 23 are being kept in an independent state without being integrated, the resin 5 supplied to each lens curved-surface part 23 is caused to overflow from the lens curved-surface part 23 and spread over its periphery.

Also in this state, as described in the first embodiment by using the plan view of FIG. 2, the resin 5 supplied to each lens curved-surface part 23 is kept in an independent state, thereby making the periphery of each resin 5 communicate outside the lens molding plate 21 and the transparent substrate 9.

Here, to keep the distance d between the lens molding plate 21 and the transparent substrate 9 in a predetermined state, as with the first embodiment, spacers may be interposed between the lens molding plate 21 and the transparent substrate 9. These spacers are each preferably provided at a position out of each lens curved-surface part 23 and between the resins 5. Also, the lens molding plate 21 and the transparent substrate 9 make the distance d kept by, for example, being equally pressed from outside. Furthermore, as with the first embodiment, the lens molding plate 21 and the transparent substrate 9 may be provided with an externally-opening flow path at a position out of each lens curved-surface part 23 and between the resins 5.

The process so far can be performed in the air, but is preferably performed in a decompressed atmosphere. With this, the process can be performed while preventing trapping of air bubbles in the resin 5, and the occurrence of an internal defect due to the mixing of air bubbles in the lens is prevented, leading to an improvement in yields. Also, after the uncured resin 5 is interposed between the lens molding plate 21 and the transparent substrate 9 in a predetermined state, the process atmosphere is returned to atmospheric pressure, or is changed to a compressed atmosphere.

Figure 6A:
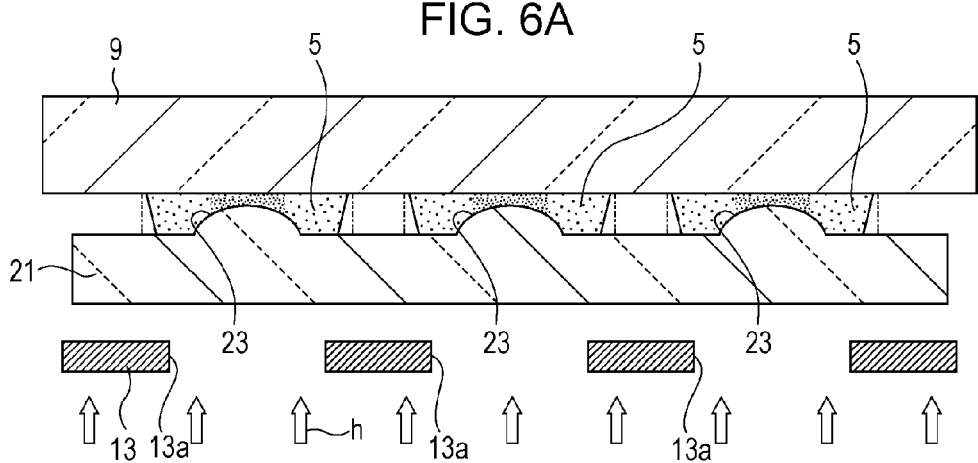
FIGS. 6A to 6C are sectional process drawings (part 2) of the procedure of concave lens formation according to the third embodiment.

Next, as depicted in FIG. 6A, the resin 5 interposed between the lens molding plate 21 and the transparent substrate 9 is irradiated with light (for example, ultraviolet rays) h, thereby starting curing of the resin 5. Here, light irradiation at a first stage is performed by using a mask 13 capable of cutting off the light h for use in curing the resin 5. This mask 13 has a plurality of openings 13a respectively corresponding to the lens curved-surface parts 23. By way of example, these openings 13a are each assumed to have an approximately same size as that of each lens curved-surface part 23.

Here, the mask 13 is disposed outside the lens molding plate 21 formed of a light-transmissive material. The openings 13a of the mask 13 are then positioned so as to correspond to the lens curved-surface parts 23 of the lens molding plate 21. In this state, irradiation of the light h is performed from outside the mask 13, and the resin 5 on each lens curved-surface part 23 is irradiated with the light h passing through the openings 13a of the mask 13 and then through the lens molding plate 21. From the irradiated part of the resin 5, curing is started.

At this time, irradiation of the light h is performed via the mask 13 so as to prevent a part of the resin 5 spreading over the periphery of each lens curved-surface part 23 from being irradiated with the light h. This prevents the resin 5 on the periphery of each lens curved-surface part 23 from being cured to cause the lens curved-surface part 23 to become in a sealed state. With this, the curing of the resin 5 on the lens curved-surface part 23 is advanced while the uncured resin 5 is being supplied to the lens curved-surface part 23 from its peripheral part, the lens curved-surface part 23 shrinking on curing due to the start of curing of the resin 5 at this stage.

In light irradiation at the first stage described above, the shape of each opening 13a of the mask 13 with respect to each lens curved-surface part 23 and the amount of irradiation of the light h have an influence on the curing process of the resin 5 described above, and thus have an influence on transfer accuracy of the lens to be obtained by completely curing the resin 5. Therefore, it is important to perform light irradiation at the first stage with the shape of each opening 13a and the amount of irradiation of the light h being optimized so as to allow the curing process of the resin 5 described above and improve transfer accuracy of the lens.

Note that, in irradiation of the light h via the mask 13 from a lens molding plate 21 side, diffraction of the light h at the edge of each opening 13a may occur, and the outgoing light h from each lens curved-surface part 23 of the lens molding plate 21 may be refracted. Due to such influences, the light h tends to scatter particularly at the edge of the opening 13a. For this reason, as long as the curing of the resin 5 can be advanced on the lens curved-surface part 23 while the uncured resin 5 is being supplied from the peripheral part of the lens curved-surface part 23 as described above, the structure of the opening 13a of the mask 13 is not restricted to be smaller than the lens curved-surface part 23.

Figure 6B:
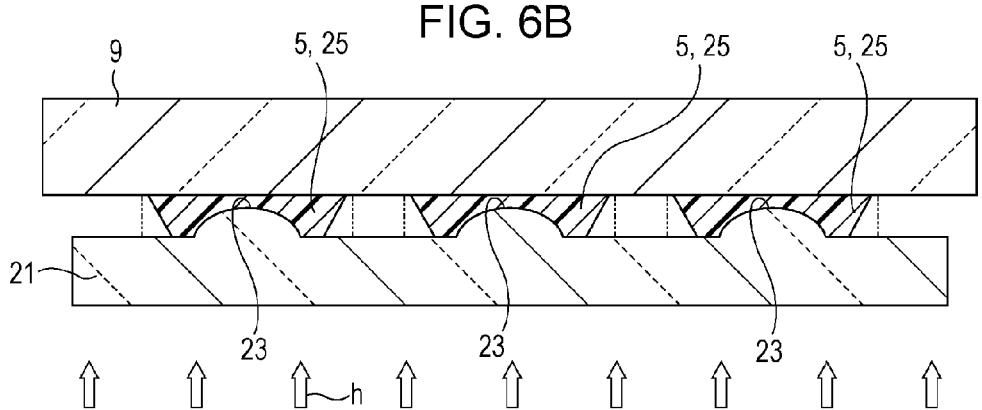

Next, as depicted in FIG. 6B, the mask is removed, and the resin 5 is entirely irradiated with the light h from outside the lens molding plate 21 formed of a light-transmissive material. With this, light irradiation at a second stage is performed in which the resin 5 is completely cured up to the periphery of the lens curved-surface part 23. Here, light irradiation is performed with an amount of irradiation corresponding to a recommended cumulative amount of light for curing the resin 5.

With irradiation of the light h with two stages described above, the curing of the resin 5 is advanced from the lens curved-surface part 23 toward its periphery to completely cure the resin 5. The completely-cured resin 5 becomes resin lens parts 25, with the curved-surface shape of each lens curved-surface part 23 of the lens molding plate 21 being transferred thereto.

The curing process of the resin 5 by light irradiation with two stages as described above is preferably performed at atmospheric pressure or in a compressed atmosphere. With this, fluidity of the resin 5 to the lens curved-surface part 23 associated with shrinkage on curing of the resin 5 is ensured, and also the internal pressure of the resin 5 is maintained to prevent expansion of minute air bubbles remaining in the resin 5. At this time, a higher pressure is preferable at an interface between the lens molding plate 21 and the resin 5 and an interface between the transparent substrate 9 and the resin 5 because of having higher effects of ensuring fluidity of the resin 5 and suppressing expansion of air bubbles.

When the resin 5 is a cationic-type ultraviolet-curable resin, the process atmosphere at this time can be atmospheric or air atmosphere. On the other hand, when the resin 5 is a radical-type ultraviolet-curable resin, the atmosphere is preferably an atmosphere without containing oxygen, such as a nitric atmosphere, so as to prevent curing inhibition by oxygen. However, the influence of curing inhibition by oxygen is limited because curing inhibition occurs only at an outer circumferential part in contact with the process atmosphere. If this influence does not have to be considered, the atmosphere may be atmospheric or air atmosphere.

Figure 6C:
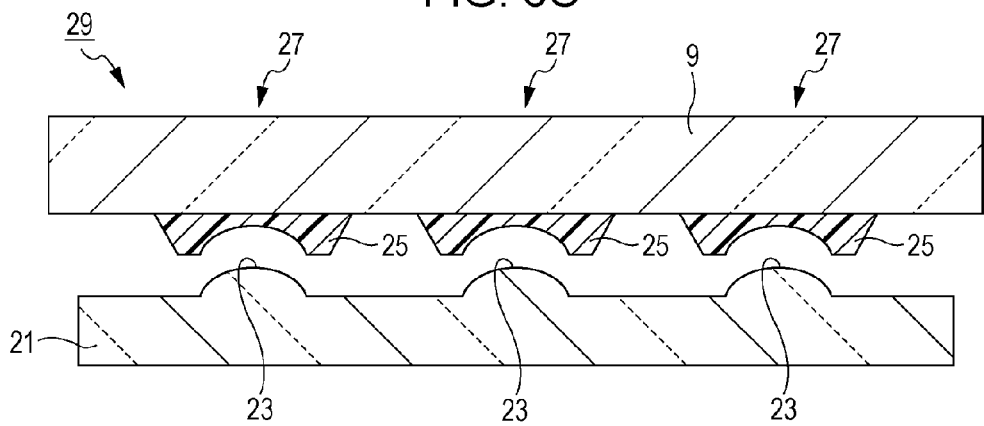

Next, as depicted in FIG. 6C, by raising the transparent substrate 9, the transparent substrate 9 and the resin lens parts 25 in intimate contact with this transparent substrate 9 are peeled off from a lens molding plate 21 side. At this time, even after the process of irradiation of the light h described above ends, a curing reaction of the resin configuring the resin lens parts 25 continues. For this reason, preferably, the shape of each resin lens part 25 is stabilized by taking some time after the process of irradiation of the light h ends, and then the resin lens parts 25 are peeled off from the lens molding plate 21. This also has an effect such that an increased temperature of the resin due to irradiation of the light h is decreased with time, thereby increasing releasability of the resin lens parts 25 from the lens molding plate 21 to allow releasing with a smaller force.

In a manner as described above, concave lenses 27 formed of the flat-shaped transparent substrate 9 and the resin lens parts 25 disposed on the transparent substrate 9 are obtained. Also, a lens array 29 with the plurality of resin lens parts 25 arranged on the transparent substrate 9 is obtained. Each of the concave lenses 27 has a feature of having a concave lens curved shape at the resin lens part 25 and having a circumferential edge A of the resin lens part 25 molded in a tapered shape that is wider toward the transparent substrate 9.

Here, each resin lens part 25 is obtained by advancing the curing of the resin 5 from the lens curved-surface part 23 toward its periphery by irradiation of the light h with two stages described above, and the uncured resin 5 is supplied to the lens curved-surface part 23, where curing advances earlier, from its periphery. At this time, the resin 5 flows to a lens curve-surface part 23 side on a lens molding plate 21 side with a property of adhesion to the resin 5 smaller than that of the transparent substrate 9 to cause shrinkage of the resin 5. With this, the resin 5 is cured in a tapered shape that is wider toward the transparent substrate 9.

Also, thereafter, each concave lens 27 may be singly hardened by cutting the transparent substrate 9 for each resin lens part 25 in some cases.

According to the third embodiment described above, the uncured resin 5 interposed between the lens molding plate 21 and the transparent substrate 9 that are disposed to face each other so as to keep the externally-opening distance d is subjected to light irradiation with two stages so that the curing of the resin 5 advances from each lens curved-surface part 23 toward its periphery. With this, as described in the first embodiment, when the resin 5 shrinks on curing on the lens curved-surface part 23, where curing advances earlier, the lens curved-surface part 23 does not become under a decompressed atmosphere. Therefore, as with the first embodiment, in lens formation using a resin, the occurrence of voids can be prevented, and also the concave lens 27 with excellent optical characteristics and excellent transfer accuracy being kept can be obtained.

Note that in the third embodiment described above, description has been made to the procedure of light irradiation for curing the resin 5 with two stages, that is, light irradiation using a mask and collective light irradiation thereafter. However, light irradiation for curing the resin 5 may be performed with further more stages in which the opening diameter of the mask is gradually widened as long as the curing process of the resin 5 described above is performed. Also, in the third embodiment, the lens molding plate 21 is configured of a light-transmissive material, and description has been made to the procedure in which, in the process of curing the resin 5 by irradiation of the light h with two stages described by using FIGS. 6A and 6B, irradiation of the light h is performed from the lens molding plate 21 side. However, the lens molding plate 21 may be configured by using a material that does not allow the light h to pass through, such as a metal mold. In this case, irradiation of the light h with two stages described above is performed from a transparent substrate 9 side.

When light irradiation is performed from the transparent substrate 9 side, the shape of each opening 13a of the mask 13 for use in light irradiation at the first stage and the amount of irradiation of light at the second stage are optimized separately from light irradiation from the lens molding plate 21 side, so that the curing process of the resin 5 described above is performed to improve transfer accuracy of the lens.

Also, the third embodiment described above can be combined with the second embodiment. That is, irradiation of the light h on the uncured resin may be performed with a procedure with one stage. In this case, as described in the second embodiment, when the uncured resin is irradiated with the light h, light irradiation is performed with a light intensity distribution so that the lens curved-surface part 23 is irradiated with the light h with an amount of light larger than an amount of light of its periphery. Furthermore, the light intensity distribution in collective irradiation is optimized so as to allow the curing process of the resin 5 described above and improve transfer accuracy of the lens.

Fourth Embodiment

Camera Module Forming Method and Camera Module

In a fourth embodiment, a camera module forming method using a lens array obtained by the procedure described in the first embodiment to the third embodiment is described.

First, as depicted in FIG. 7, together with a plurality of lens arrays 19 and 29 which are formed in the procedure described in the first embodiment to the third embodiment, a wafer 33 on which a plurality of image pickup devices 31 are formed, a spacer 35, and a lens cap array 37 are prepared.

The lens arrays 19 or the lens arrays 29 for use herein are each formed with a plurality of convex lenses 17 or concave lenses 27 arranged on a transparent substrate having an outer shape approximately identical to that of the wafer 33 on which the image pickup devices 31 are formed. The state of arrangement of the convex lenses 17 or concave lenses 27 matches that of arrangement of the image pickup devices 31.

The spacer 35 is formed with a plurality of openings arranged on a substrate having an outer shape approximately identical to that of the wafer 33 on which the image pickup devices 31 are formed. The state of arrangement of the openings matches that of arrangement of the image pickup devices 31 and the convex lenses 17 or concave lenses 27.

The lens cap array 37 is formed with a light-shielding pattern provided on a substrate having an outer shape approximately identical to that of the wafer 33 on which the image pickup devices 31 are formed. This light-shielding pattern is formed in a shape having open portions corresponding to the arrangement of the image pickup devices 31 and the convex lenses 17 or concave lenses 27, and covering areas surrounding the open portions.

Here, as depicted in FIG. 7, on the wafer 33 where the image pickup devices 31 are formed, the spacer 35, the lens array 19 or lens array 29, another spacer 35, another lens array 19 or lens array 29, and then the lens cap array 37 are disposed to be laminated in this order. At this time, the image pickup devices 31 on the wafer 33, the openings in the spacers 35, and the convex lenses 17 or concave lenses 27 on the lens arrays 19, 29 are matched in a laminating direction, and they are positioned so that their periphery is covered with the light-shielding pattern of the lens cap array 37. Then, the substrates are bonded and fixed on the periphery of the image pickup devices 31 and the convex lenses 17 and the concave lenses 27, thereby obtaining a laminated body 39.

Figure 8:
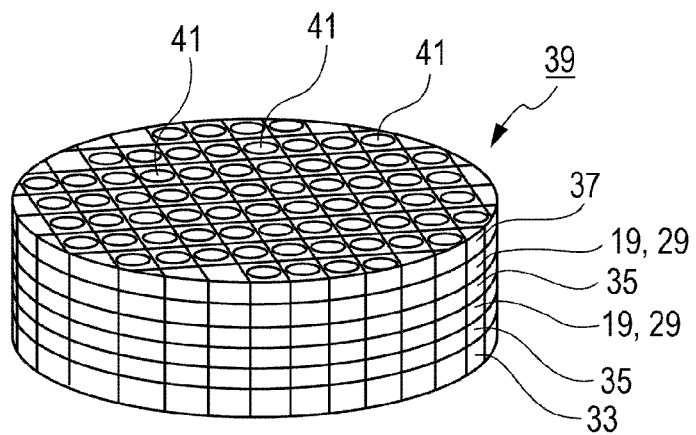
FIG. 8 is a perspective view for describing the camera module manufacturing method according to the fourth embodiment.

Then, as depicted in FIG. 8, the laminated body 39 of the wafer 33, the spacer 35, the lens array 19 (29), the spacer 35, the lens array 19 (29), and the lens cap array 37 is divided for each image pickup device 31, thereby obtaining a plurality of lens modules 41.

Figure 9:
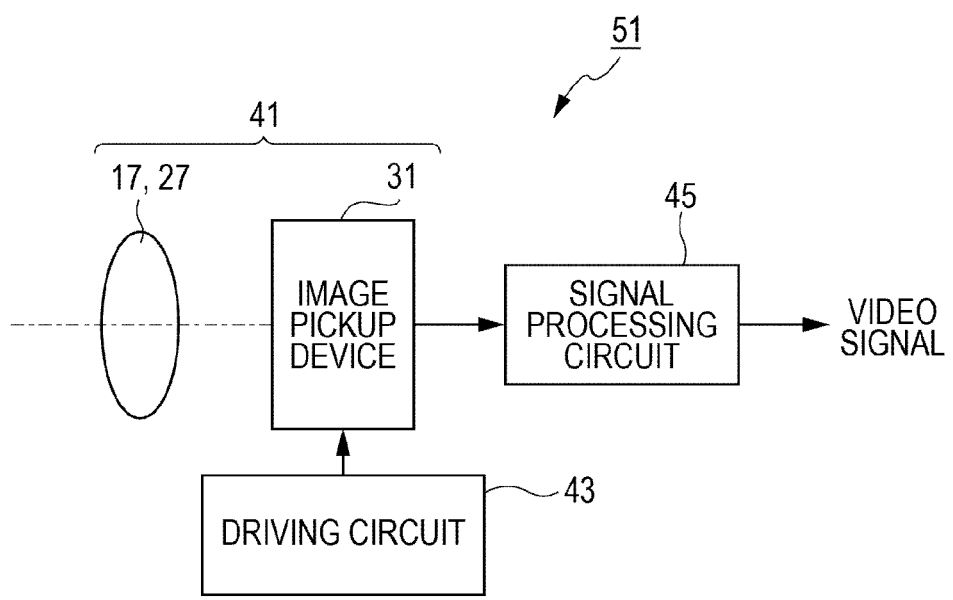
FIG. 9 is a structural diagram of a camera module of the fourth embodiment.

FIG. 9 depicts the structure of a camera module 51 using the lens module 41 described above. The lens module fabricated as described above can be applied to, for example, a camera system, such as a digital camera or a video camera, or a camera module, such as a portable phone having an imaging function or other devices including an imaging function.

This camera module 51 has the lens module 41 with the image pickup device 31 and the convex lens 17 or the concave lens 27 laminated, and a driving circuit 43 driving the image pickup device 31, and a signal processing circuit 45 processing an output signal from the image pickup device 31.

The image pickup device 31 is formed of a CCD solid-state image pickup device, a CMOS sensor, or the like. The convex lens 17 or the concave lens 27 is formed by laminating the convex lenses 17 or the concave lenses 27 fabricated by the forming method of each embodiment described above as many as necessary for use. From image light (incident light) from a subject, an image is formed on an imaging plane of the image pickup device 31. The driving circuit 43 supplies a driving signal for controlling a transfer operation of the image pickup device 31. With a driving signal (timing signal) supplied from the driving circuit 43, signal transmission from the image pickup device 31 is performed. The signal processing circuit 45 performs various types of signal processing. A video signal subjected to signal processing is stored in a storage medium, such as a memory, or is output to a monitor.

According to the camera module 51 of the fourth embodiment, as described in the first to third embodiments, the convex lens 17 and the concave lens 27 with excellent optical characteristics and excellent transfer accuracy being kept without the occurrence of voids are used. For this reason, light-gathering characteristics with respect to the image pickup device 31 in the camera module 51 can be improved, thereby improving image quality.

The present disclosure contains subject matter related to that disclosed in Japanese Priority Patent Application JP 2010-170886 filed in the Japan Patent Office on Jul. 29, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A lens forming method comprising the steps of:
   interposing an uncured resin between a lens molding plate and a flat-shaped transparent substrate that are disposed to face each other with a distance in between for an opening, the lens molding plate having a plurality of lens-curved surface parts; and
   performing light irradiation on the resin interposed between the lens molding plate and the transparent substrate so that curing of the resin advances from the plurality of lens curved-surface parts on the lens molding plate toward a periphery thereof,
   wherein,
   the step of performing light irradiation includes irradiating each lens curved-surface part on the lens molding plate with an amount of light larger than an amount of light with which a periphery of each lens curved-surface part is irradiated by using a lens array having a plurality of condenser lenses, the light irradiation being performed in a single stage.

2. The lens forming method according to claim 1, wherein in the step of interposing the uncured resin between the lens molding plate and the flat-shaped transparent substrate, the uncured resin is disposed so as to cover each of the plurality of lens curved-surface parts and the periphery thereof independently.

3. The lens forming method according to claim 1, wherein the lens array is disposed to face the lens molding plate such that the plurality of condenser lenses correspond to the plurality of the lens-curved surface parts on the molding plate.

4. The lens forming method according to claim 1, wherein the light irradiation is performed collectively on the plurality of the lens-curved surface parts using the lens array.

* * * * *